Patented June 10, 1930

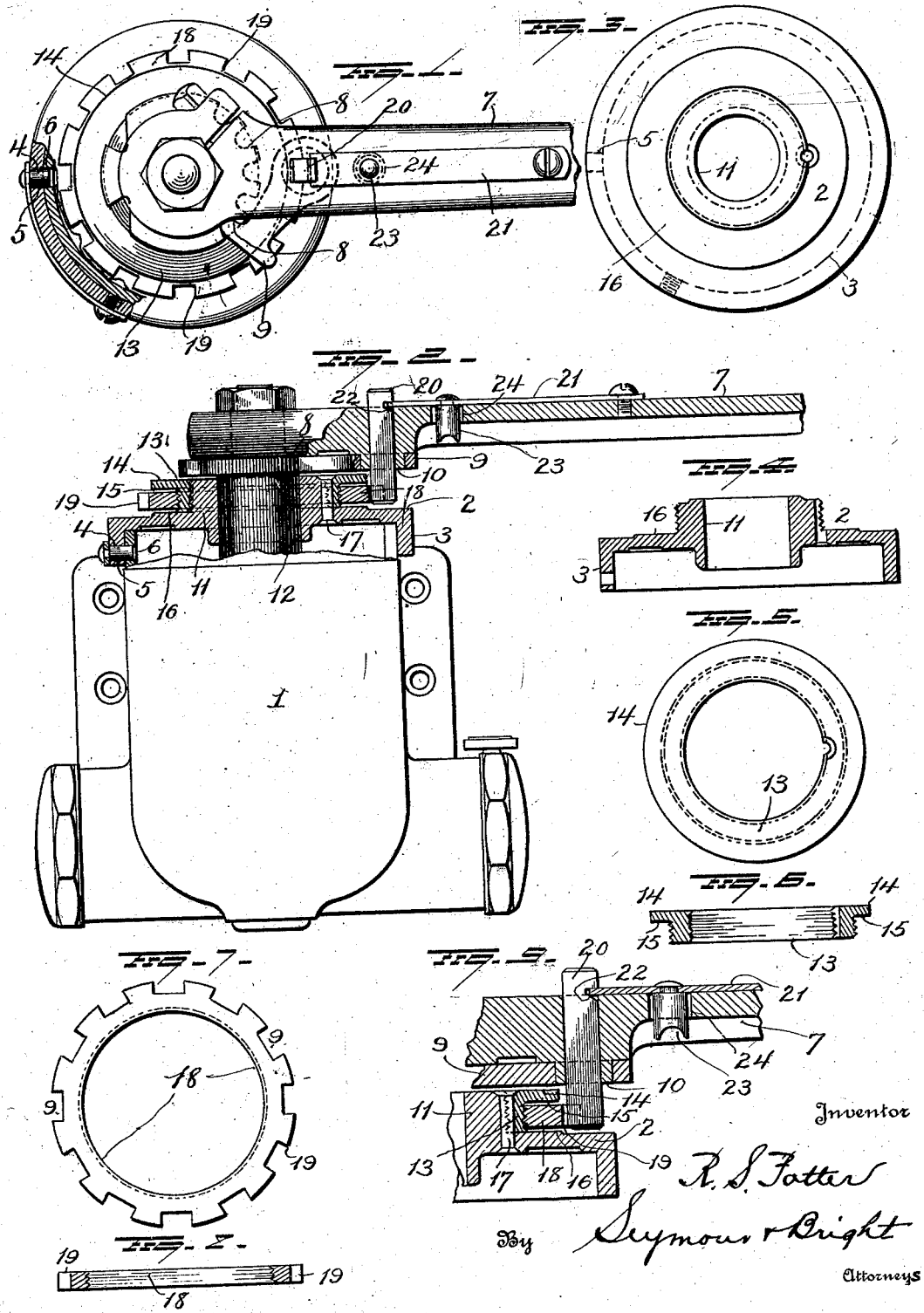

1,763,323

UNITED STATES PATENT OFFICE

ROBERT S. POTTER, OF GREENWICH, CONNECTICUT, ASSIGNOR TO THE YALE & TOWNE MANUFACTURING COMPANY, OF STAMFORD, CONNECTICUT

DOOR CLOSER

Application filed November 12, 1924. Serial No. 749,455.

This invention relates to improvements in door holders and which are particularly adaptable for closers of the so-called "liquid" type, although the said improvements may be applied to other types of closers now in use.

An object of the present invention is to provide simple and efficient friction means which may be applied to door closers such as now manufactured and which will operate automatically, with either a right or a left hand door, to hold the door to the desired extent of open position but permit it to be closed upon the application of comparatively light pressure.

With this and other objects in view, the invention consists in certain novel features of construction and combinations of parts as hereinafter set forth and pointed out in the claims.

In the accompanying drawings,—

Figure 1 is a plan view partly in section showing a door closer in which the improvements are embodied.

Figure 2 is a view partly in elevation and partly in section.

Figure 3 is a plan view of the cap member of the closer.

Figure 4 is a sectional view of the cap member shown in Figure 3.

Figure 5 is a plan view of the friction ring.

Figure 6 is a sectional view of the friction ring.

Figure 7 is a plan view showing the annular friction plate.

Figure 8 is a sectional view through said plate, and

Figure 9 is a fragmentary sectional view showing parts illustrated in Figure 2, on a larger scale.

In the drawings, the casing of a door closer is illustrated at 1 and provided with a cap member 2 having a flange 3 which embraces the upper portion of the casing 1. A spring pressed stop pin 4 passes through a hole 5 in the flange 3 and enters a seat 6 in the casing 1.

The closer is provided with a main arm or lever 7, a ratchet 8 and its pawl 9,—the latter being mounted on a boss 10 on the under face of the lever.

The cap member 2 of the casing is provided with a central hub 11 through which the shaft 12 of the closer passes and this hub is threaded exteriorly to receive the interiorly threaded portion of a friction ring 13,—the latter having at its upper edge portion an annular flange 14, the under face of which constitutes a friction surface 15. That portion of the cap 2 lying directly below the friction ring 13 provides a friction surface 16. In order to guard against possibility of any turning movement of the friction ring after the same is applied to the hub 11, said ring may be secured to the cap 2 by riveting as illustrated at 17.

The friction ring 13 is exteriorly threaded and receives an interiorly threaded, annular friction plate 18,—the thickness of said plate being appreciably less than the distance between the friction surfaces 15 and 16. The friction plate 18 is provided with a plurality of peripheral recesses or openings 19 in any one of which a pin or stud 20 carried by the main arm 7 is adapted to enter. The pin or stud 20 passes freely through the lever 7 and the boss 10 so as to be capable of sliding into or out of engagement in any one of the recesses or openings 19 in the friction plate 18, and said pin or stud is normally held in such engagement by means of a spring 21 secured at one end to the lever 7 and at its other or free end, entering a notch 22 in the upper portion of said pin or stud. A thumb piece 23 is secured to the spring 21 and depends through a hole 24 in the lever 7, to facilitate the manual operation of said spring to withdraw the pin or stud 20 from operative relation to the friction plate 18.

With the improvements as above described, the pin or stud 20 will, as the door opens, cause the friction plate to turn and by its threaded connection with the friction ring, to move toward one or the other of the friction surfaces 15 or 16 (accordingly as the door is a right or a left hand one) and by frictional engagement with one or the other of said surfaces, hold the door in its open position but permit the door to be closed upon the application of slight pressure, which pressure would be applied to the door to release frictional engagement between the friction plate and ring, whereupon the door would be free to close. By raising the pin or stud from engagement in one of the recesses or openings 19 in the friction plate 18 and causing it to engage in another of said recesses or openings, adjustment may be effected to bring the holding action at the desired point of door opening.

It will be observed that parallel friction members are provided and so related as to obtain reversible holding action. These friction members are shown as located on the casing of the door closer, but I do not wish to be limited to such specific location, but would have it understood that the reversible friction holding means might be utilized at other points on the door closer.

Having fully described my invention what I claim as new and desire to secure by Letters Patent, is:—

1. The combination with the shaft and arm of a door closer, of a stationary friction surface centered about said shaft, a movable friction surface similarly mounted cooperable with said stationary surface to hold a door open, and means actuated by said arm and having adjustable connection with said movable friction surface to move the latter into frictional engagement with said stationary surface.

2. The combination with the casing and lever of a door closer, said casing provided with means forming parallel friction surfaces spaced apart, of a friction member mounted between said friction surfaces and movable relatively thereto, and a part actuated by the lever and cooperable with said member to cause the latter to move into frictional engagement with one or the other of said friction surfaces when the door to which the closer devices are applied is open.

3. The combination with the casing and lever of a door closer, said casing provided with means forming parallel friction surfaces spaced apart, of a friction member mounted between said friction surfaces and movable relatively thereto, and a part actuated by the lever and cooperable with said member to cause the latter to move into frictional engagement with one or the other of said friction surfaces when the door to which the closer devices are applied is open, and means whereby the cooperable relation of said part to the friction member may be adjusted.

4. The combination with the casing and lever of a door closer, of a cap on said casing having a hub, a friction ring secured on said hub and having a flange providing a friction surface, said cap having a friction surface parallel with and spaced from the before mentioned friction surface, an annular friction plate threaded on said friction ring between the said friction surfaces and movable relatively to each, and a projection actuated by the lever and cooperable with said friction plate to turn the same and thereby cause it to move toward one or the other of said friction surfaces.

5. The combination with the casing and lever of a door closer, of a cap on said casing having a hub, a friction ring secured on said hub and having a flange providing a friction surface, said cap having a friction surface parallel with and spaced from the before mentioned friction surface, an annular friction plate threaded on said friction ring between the said friction surfaces and movable relatively to each, a projection actuated by the lever and cooperable with said friction plate to turn the same and thereby cause it to move toward one or the other of said friction surfaces, and means whereby the co-operative relation between said projection and the friction plate may be adjusted.

6. The combination with the shaft and arm of a door closer, of a stationary friction member centered about said shaft, a friction member similarly mounted and movable into frictional engagement with said first-mentioned friction member and having a plurality of recesses or openings, a spring-pressed manually operable stud carried by said arm and engageable with the movable friction member at any one of the recesses or openings therein whereby to impart a predetermined movement to said member during opening movement of the door.

7. Door holding means for a door closer, comprising two friction surfaces and a friction member adapted to engage one of said surfaces when the door is opened in one direction, and the other of said surfaces when the door is opened in the opposite direction.

8. Door holding means for a door closer, comprising two parallel friction surfaces, a friction member mounted between and normally out of contact with these surfaces and adapted to engage one or the other of said surfaces dependent upon the direction of the opening of the door.

9. Door holding means for a door closer comprising a pair of parallel unyielding friction surfaces mounted in spaced relation, a friction block mounted between said surfaces, and means operable upon the opening of the door to which the closer is applied to cause the friction block to move into frictional engagement with a predetermined one of said parallel friction surfaces.

10. Door holding means for a door closer comprising a pair of parallel friction surfaces mounted in spaced relation, a friction block, screw threaded means between said friction surfaces upon which said friction block is adapted to ride, and means operable upon the opening of the door to which the closer is applied to cause the friction block to ride on said screw threaded means into binding frictional engagement with a predetermined one of said parallel friction surfaces.

11. Door holding means for a door closer assembly comprising two unyielding friction surfaces, a friction block adapted to engage one of said surfaces when the door is opened in one direction, and the other of said surfaces when the door is opened in the opposite direction, and means carried by the door closer assembly and operable upon the opening of the door to move said friction block into one of its engaging positions.

12. Door holding means for a door closer assembly comprising two parallel friction surfaces coaxially mounted in fixed spaced relation, a friction block mounted between said surfaces and adapted to engage one or the other of said surfaces dependent upon the direction of the opening of the door, and means carried by said door closer assembly and operable upon the opening of the door to move said friction block into one of its engaging positions.

In testimony whereof, I have signed this specification.

ROBERT S. POTTER.